United States Patent
Zhou et al.

(10) Patent No.: US 11,645,239 B2
(45) Date of Patent: May 9, 2023

(54) AUTOMATED INTELLIGENT FILE CONVERSION AND EXECUTION

(71) Applicant: International Business Machines Corporation, Armonk, NY (US)

(72) Inventors: Allen Zhou, Hyde Park, NY (US); Weon Weian Yuan, Hyde Park, NY (US); Hiren Ramlal Shah, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/952,256

(22) Filed: Nov. 19, 2020

(65) Prior Publication Data

US 2022/0156229 A1    May 19, 2022

(51) Int. Cl.
  *G06F 16/00* (2019.01)
  *G06F 16/178* (2019.01)
  *H04L 67/00* (2022.01)
  *G06F 40/143* (2020.01)
  *G06F 16/11* (2019.01)

(52) U.S. Cl.
  CPC ........ *G06F 16/1794* (2019.01); *G06F 16/116* (2019.01); *G06F 40/143* (2020.01); *H04L 67/34* (2013.01)

(58) Field of Classification Search
  None
  See application file for complete search history.

(56) References Cited

U.S. PATENT DOCUMENTS

| | | | |
|---|---|---|---|
| 8,468,124 B2* | 6/2013 | Bonanno | G06F 11/362 707/608 |
| 9,811,849 B2 | 11/2017 | Bursey | |
| 10,469,615 B2 | 11/2019 | Shribman et al. | |
| 2014/0358844 A1* | 12/2014 | Mundlapudi | G06F 16/254 707/602 |
| 2017/0153880 A1 | 6/2017 | Chen et al. | |
| 2020/0004598 A1* | 1/2020 | Brebner | G06F 9/5055 |

FOREIGN PATENT DOCUMENTS

CN        105245371 A     1/2016

OTHER PUBLICATIONS

"A Method For Bundling and Rapidly Deploying Pre-configured Software Systems", An IP.com Prior Art Database Technical Disclosure, IP.com No. IPCOM000170315D, IP.com Electronic Publication Date: May 15, 2008, 5 pages.

(Continued)

*Primary Examiner* — Tuankhanh D Phan
(74) *Attorney, Agent, or Firm* — Kelsey M. Skodje

(57) ABSTRACT

A method, system, and computer program product for intelligent file conversion is provided. The method receives a first workflow in a first tool format. The first workflow contains a set of first elements associated with a set of tasks. The set of first elements in the first tool format are mapped to a set of second elements in a second tool format. The method generates a second workflow in the second tool format based on the set of second elements. The second workflow is validated based on a file definition schema for the second tool format and the second workflow is routed to an execution server.

20 Claims, 6 Drawing Sheets

(56) References Cited

OTHER PUBLICATIONS

"System and method for continuous build, test and deployment of software solutions using dynamic virtualization infrastructure", An IP.com Prior Art Database Technical Disclosure, IP.com No. IPCOM000199713D, IP.com Electronic Publication Date: Sep. 15, 2010, 3 pages.
"Distributed Task Execution Framework", An IP.com Prior Art Database Technical Disclosure, IP.com No. IPCOM000202471D, IP.com Electronic Publication Date: Dec. 16, 2010, 4 pages.
Janssen et al., "IBM z/OS Management Facility V2R3", Redbooks, IBM, Apr. 2018, 614 pages.
Ansible, "Red Hat Ansible use case—provisioning," https://www.ansible.com/use-cases/provisioning, printed Nov. 4, 2022, 1 pg.
Ansible, Red Hat, "Infrastructure Automation with Ansible," https://www.ansible.com/integrations/infrastructure, printed Nov. 4, 2022, 3 pgs.
IBM, "System Automation for z/OS, Customizing and Programming," Version 3, Release 5, 378 pgs., ©1996, 2014.
Lowe, S.A., "Automated setup and cloud VM provisioning with Ansible," https://techbeacon.com/enterprise-it/learning-devops-automated-setup-cloud-vm-provisioning-ansible, printed Nov. 4, 2022, 4 pgs.

\* cited by examiner

AUTOMATED INTELLIGENT FILE CONVERSION AND EXECUTION

BACKGROUND

Developers and programmers often gain considerable skill using a specific platform, programming environment, or system through time and training. Programming environments and task execution tools may incorporate command line prompts or interfaces with which developers and programmers become familiar. Transitioning to different platforms, programming environments, or interfaces often incurs difficulties and inefficiencies relating to a learning curve for adopting the new platforms, environments, or interfaces. Transitions between some platforms, environments, or interfaces increase normal difficulties by lacking implementation of similar functions, architectures, or protocols. Platforms, environments, and interfaces managed by third parties may cause additional difficulties and inefficiencies relating to changes or updates to the platforms, environments, and interfaces implemented by the third parties.

SUMMARY

According to an embodiment described herein, a computer-implemented method for intelligent file conversion is provided. The method receives a first workflow in a first tool format. The first workflow contains a set of first elements associated with a set of tasks. The set of first elements in the first tool format are mapped to a set of second elements in a second tool format. The method generates a second workflow in the second tool format based on the set of second elements. The second workflow is validated based on a file definition schema for the second tool format and the second workflow is routed to an execution server.

According to an embodiment described herein, a system for intelligent file conversion is provided. The system includes one or more processors and a computer-readable storage medium, coupled to the one or more processors, storing program instructions that, when executed by the one or more processors, cause the one or more processors to perform operations. The operations receive a first workflow in a first tool format. The first workflow contains a set of first elements associated with a set of tasks. The set of first elements in the first tool format are mapped to a set of second elements in a second tool format. The operations generate a second workflow in the second tool format based on the set of second elements. The second workflow is validated based on a file definition schema for the second tool format and the second workflow is routed to an execution server.

According to an embodiment described herein, a computer program product for intelligent file conversion is provided. The computer program product includes a computer-readable storage medium having program instructions embodied therewith, the program instructions being executable by one or more processors to cause the one or more processors to receive a first workflow in a first tool format. The first workflow contains a set of first elements associated with a set of tasks. The set of first elements in the first tool format are mapped to a set of second elements in a second tool format. The computer program product generates a second workflow in the second tool format based on the set of second elements. The second workflow is validated on a file definition schema for the second tool format and the second workflow is routed to an execution server.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
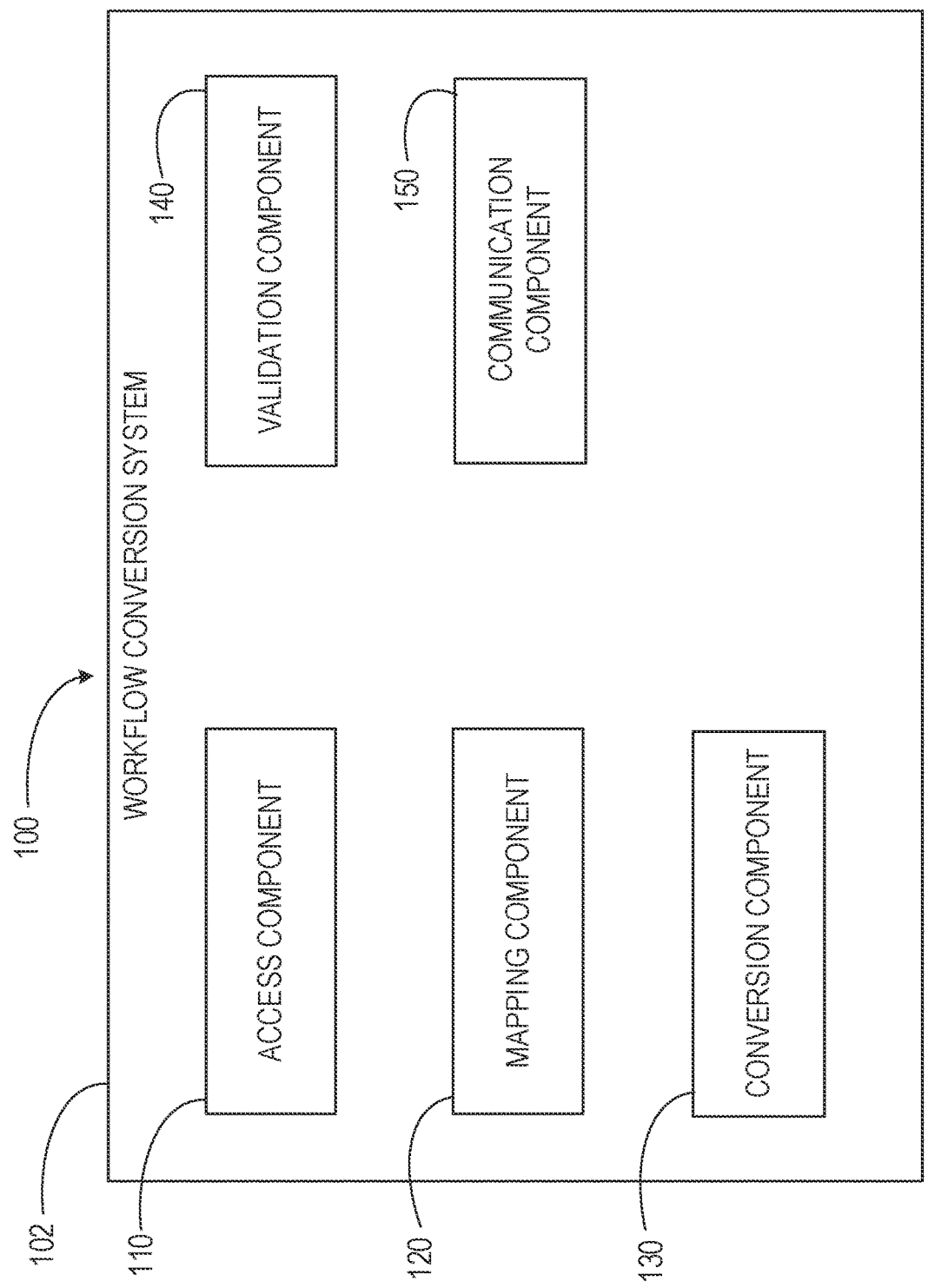
FIG. 1 depicts a block diagram of a computing environment for implementing concepts and computer-based methods, according to at least one embodiment.

The present disclosure relates generally to methods for intelligent file conversion. More particularly, but not exclusively, embodiments of the present disclosure relate to a computer-implemented method for automated intelligent conversion of user defined manifest files. The present disclosure relates further to a related system for intelligent file conversion, and a computer program product for operating such a system.

Mainframe operating systems may provide users, developers, or programmers with tools to manage systems, servers, platforms, or environments using the mainframe operating system. Some mainframe operating systems enable management tools using web applications. These web applications may allow systems to perform task executions based on user programming or other interactions. Mainframe operating systems may use specified programming languages, protocols, user interfaces, and application programming interfaces (API) to implement functionality and tasks across systems, servers, platforms, and environments. While these programming languages, protocols, interfaces, and APIs enable functionality, they may limit a user base of the mainframe operating system to users, developers, and programmers having training or knowledge of the operating system.

Where developers or programmers are acclimated to a given mainframe operating system, those developers and programmers may encounter challenges in interacting with other operating systems, programming environments, systems, applications, or tools. Similarly, developers and programmers who are acclimated to other systems, applications, or tools may encounter difficulties and a steep learning curve in acclimating to a given mainframe operating system or tools and programs associated therewith. Further, developers and programmers acclimated with a mainframe operating system may encounter difficulties in response to updates by entities responsible for establishing or maintaining mainframe operating systems. Overcoming such difficulties and learning curves can impart cost and inefficiency issues to developers and programmers as they are brought up to speed. While some conversion tools exist, suitable tools for conversion of file formats to mainframe operating system workflows are not currently available or which are capable of converting to the mainframe operating system workflow from a data manifest schema and back to the data manifest schema from a suitable operating system workflow. Further, conversion between some tool or file formats are currently performed by using subject matter experts to perform manual conversion.

Embodiments of the present disclosure provide unified methods, systems, and programming products which address inefficiencies and issues encountered by developers, programmers, and other users when interacting with unfamiliar systems, environments, applications, and tools. An automated infrastructure is described which is able to run in a plurality of systems or environments. Some embodiments of the present disclosure enable users with a lower level of knowledge of a given system to interact with and successfully initiate tasks on those systems. The automated infrastructure may be implemented with an open source interface, maintained without exposing aspects of a given architecture, system, environment, or operating system which may be exclusive to the given platform. For example, embodiments of the infrastructure described in the present disclosure may be implemented on different systems, programming environments, virtual machines, containers, private servers, cloud technologies, or other suitable resources and enable interaction with a desired mainframe operating system to cause that operating system to perform tasks on remote or local systems.

Embodiments of the present disclosure enable task execution on a mainframe operating system by providing a file converter and extended protocol functionality to enable an automated infrastructure for intelligent file conversion. In some embodiments, the infrastructure enables conversion of serialized data or manifest files to working extensible markup language (XML) workflows. The infrastructure submits the XML workflows to the mainframe operating system for execution. Subsequent execution of the workflow may be based on the user defined manifest file subject to the initial conversion. In this way, embodiments of the present disclosure may enable conversion of a plurality of open standard manifest formats as input to a given mainframe operating system. Instructions or workflows converted by embodiments of the present disclosure abide by both specifications and requirements associated with an originating tool or file format and a resulting workflow format to enable interaction between the systems having different formats.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a workflow conversion system 102. The workflow conversion system 102 may comprise an access component 110, a mapping component 120, a conversion component 130, a validation component 140, and a communication component 150. The access component 110 receives or accesses workflows for conversion by the workflow conversion system 102. The mapping component 120 maps elements of received workflows in a first format to elements of a second format or destination format. The conversion component 130 generates one or more converted workflows from the received workflow. The validation component 140 validates the one or more converted workflows. The communication component 150 transmits converted workflows to resources designated to execute the converted workflow. Although described with distinct components, it should be understood that, in at least some embodiments, components may be combined or divided, and/or additional components may be added without departing from the scope of the present disclosure.

Figure 2:
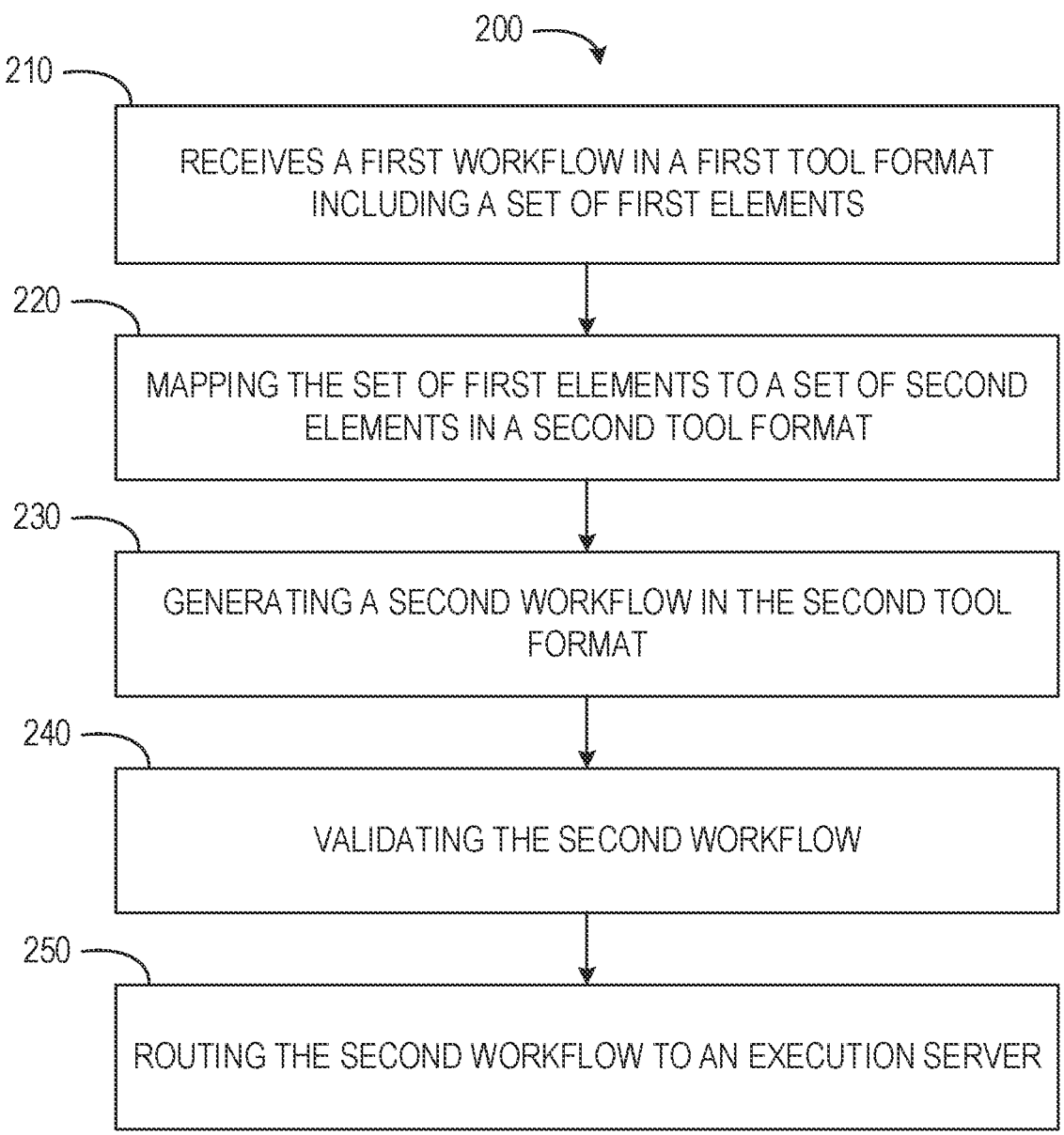
FIG. 2 depicts a flow diagram of a computer-implemented method for intelligent file conversion, according to at least one embodiment.

Referring now to FIG. 2, a flow diagram of a computer-implemented method 200 is shown. The computer-implemented method 200 is a method for intelligent file conversion. In some embodiments, the computer-implemented method 200 may be performed by one or more components of the computing environment 100, as described in more detail below.

At operation 210, the access component 110 receives a first workflow. The first workflow is received in a first tool format. In some embodiments, the first workflow may be any open standard manifest format. For example, the first workflow may be provided in a first tool format of a markup language or extensible markup language. In some embodiments, the first tool format is a human-readable data-serialization file. In some instances, the human-readable data-serialization file is a YAML file format. The YAML file format may be an Ansible Playbook YAML. The first workflow may be provided in a JavaScript Object Notation (JSON) format. Although described with reference to specific formats, it should be understood that the first workflow maybe provided in any suitable tool format. The workflow contains a set of first elements. The set of first elements are associated with a set of tasks. In some embodiments, the set of elements are property names, product names, methods, tasks, plays, or other defined terms within the first tool format.

The access component 110 may receive or access the first workflow from a command line prompt or a graphical user interface. In some embodiments, the access component 110 receives the first workflow as a file transmitted across a network. In some instances, the workflow conversion system 102 may be stored, at least partially, on a user's computing device. In such instances, the access component 110 may receive or access the first workflow in response to the user generating the first workflow.

In some embodiments, the access component 110 receives the first workflow, once generated by a user, by presenting or generating a graphical user interface configured to receive a file, link, or other representation of the first workflow. For example, the user may initiate the workflow conversion system 102 by selecting an icon or a user interface element within a workflow generation application. The access component 110 may generate the graphical user interface upon selection of the interface element. The user may select the first workflow within the user interface or drag and drop a representation of the first workflow into the user interface. Once received, the access component 110 may pass at least a portion of the first workflow to one or more other components of the workflow conversion system 102.

At operation 220, the mapping component 120 maps the set of first elements to a set of second elements. The set of first elements are in the first tool format. The set of second elements are in a second tool format. For example, the mapping component 120 may map each first element to a second element in the second tool format. Upon receiving the first workflow, the mapping component 120 may access a workflow file to map the set of first elements to the set of second elements, as discussed in more detail below.

In some embodiments, the mapping component 120 maps the set of first elements by parsing each first element (e.g., each property name within the first workflow). The mapping component may then map each first element to a second element of the set of second elements. In some embodiments, the second tool format is an XML workflow file. The second tool format may be a temporary extensible markup language (XML) workflow.

In some embodiments, the mapping component 120 maps the set of first elements to the set of second elements by parsing each first element of the set of first elements. The set of first elements may be parsed based on a language syntax definition. In some embodiments, the language syntax definition defines a relationship between elements within the first tool format and elements within the second tool format. For example, the language syntax definition may be used to parse property name from an Ansible Playbook to an equivalent property in a z/OSMF workflow. In some embodiments, the language syntax file controls how the mapping component 120 and the conversion component 130 parses the received first workflow to generate the second workflow according to how the input (e.g., the first workflow) is structured. The language syntax file may thus cause the mapping component 120 and the conversion component 130 to generate an output file that similar to or the same as the input file depending on a manner in which the respective environments of the first and second workflows have properties and property values arranged or defined. In some instances, the language syntax definition file is configured in each installation before mapping and conversion of the first workflow begins.

Once parsed and mapped, the mapping component 120 passes the mapped set of first elements and set of second elements to the conversion component 130.

At operation 230, the conversion component 130 generates a second workflow in the second tool format. The second workflow is generated based on the set of second elements. In some embodiments, the second workflow is generated as a temporary XML workflow. For example, the conversion component 130 may systematically translate an Ansible Playbook (e.g., the first workflow) in YAML format to a valid z/OSMF workflow file in an XML format. The conversion component 130 may generate the second workflow based on specifications, syntax, and programmatic requirements for both the Ansible and z/OSMF files. Once generated, the second workflow is passed to the validation component.

The conversion component 130 may operate automatically on receiving the input of the first workflow in the first tool format. In some embodiments, the conversion component 130 automatically processes content of the first workflow and outputs a result in the form of generating the second workflow. The conversion component 130 may automatically update definitions within one or more of the language syntax definition file and a file definition schema.

In some embodiments, the conversion component 130 is deployed as an independent middle-ware program within a computing system. This independent middle-ware program may communicate with a client using the first tool format on the computing system and a remote server or network resource using the second tool format. The conversion component 130 may operate in an offline mode on the computing system. In some embodiments, the conversion component 130 is preconfigured based on the computing system, the first tool format, or an environment calling on or passing input to the conversion component 130. The preconfiguration may configure or select, for use in generating workflows in the second tool format, one or more of a definition specification, the language syntax definition file, and the file definition schema. Operating in an offline mode within the computing system, the conversion component 130 may convert a provided workflow or generate subsequent workflows locally. Generating converted workflows locally may include performing validation operations locally, without use of external communication to a server responsible for execution of the converted workflow.

In some embodiments, the conversion component 130 operates bidirectionally. Bidirectional operation of the conversion component 130 may enable modification of the workflow from either the computer system or the execution server receiving the second workflow. In some embodiments, bidirectional operation enables the conversion component 130 to convert the workflow from the first tool format to any other suitable tool format. Thus, the conversion component 130 may enable migration of a workflow to environments other than the execution server.

At operation 240, the validation component 140 validates the second workflow. The second workflow may be validated based on a file definition schema. The file definition schema may be associated with the second tool format. The validation component 140 may validate each element, property, and value in the second workflow. In some embodiments, the validation component 140 validates the second workflow by checking if properties included in the second workflow are properly defined, values are within character or other suitable limits, and properties are in suitably executable order. In some embodiments, multiple deployments of the conversion infrastructure, per client environment, may share or reuse the file definition schema for validation and the language syntax definition file for mapping and conversion. The validation component 140 may cooperate with the conversion component 130 to automatically validate the second workflow upon generation of the second workflow by the conversion component 130. In some embodiments, the validation component 140 validates the second workflow along with the language syntax definition file and the file definition schema. In some embodiments, the validation component 140 validates the first workflow. Validation of the first workflow may be performed prior to, or along with, validation of one or more of the second workflow, the language syntax definition, and the file definition schema.

In some embodiments, the validated second workflow fulfills all features of the first workflow and first tool format that are compatible with the second tool format. For example, the second workflow fulfills definitions, variable and property substitutions, workflow template reading, draft vs. publish, and other defined operations.

At operation 250, the communication component 150 routes the second workflow to an execution server. Once generated and validated, the second workflow may be routed to a computing resource (e.g., the execution server) which is to execute the second workflow. The execution server may be a computer system, a server, a mainframe, or any other computing resource to which the second workflow may be routed over a communications network. The second workflow, once generated and validated, may be directly imported to the computing resource or execution server to perform tasks in the scope of a mainframe operating system accessible using the second tool format. For example, the second workflow may be executed to perform JCL jobs, UNIX shell scripts, TSO, commands, or any other suitable tasks or operations.

In some embodiments, the communication component 150 routes the second workflow to the execution server using a secure shell network (SSH) protocol. The SSH routing may directly pass the second workload to a customized execution module configured to run or execute converted workflows within the execution server. The communication component 150 may route the second workflow to the execution server using SSH to drive customized workflow execution by the execution server natively. The communication component 150 may route the second workflow using SSH by initiating an SSH request to transfer the second workflow to the execution server, execute a payload of the SSH request, and return a status back to the computing system via SSH. In some instances, the communication component 150 sends a REST API request to the execution server, allows the second workflow to be processed or performed by the execution server, and receives a status code back upon completion.

In some instances, a rule-based access control (RBAC) may be managed by SSH, using a key pair and authentication by username and password in the execution server. The execution server may associate a user or computing device transmitting the second workflow by SSH with specified user credentials for access authentication. Associating SSH with user credentials may encapsulate the user credential within the execution server to provide basic authentication of user credentials. In some instances, the execution server uses the user credentials in an SSH key or a basic authentication to grant permissions for authorization to perform or execute the second workflow.

In some embodiments, the communication component 150 routes the second workflow to the execution server using the SSH protocol and secure socket layer (SSL) or hypertext transfer protocol secure (HTTPS). The conversion component 130, the validation component 140, and the communication component 150 may cooperate and be configured to remotely connect to the execution server. In some instances, the communication component 150 uses SSH and HTTPS or SSL to drive representational state transfer (REST) requests to the execution server. Such REST requests may engage APIs of the execution server to perform workflow executions of the second workflow. For example, where the first tool format is an Ansible Playbook, the communication component 150 may use a web API request, using a REST API of the execution server to transfer the second workflow. In some embodiments, the communication component 150 uses SSL and HTTPS where the execution server handles RBAC aspects of the transfer of the second workflow. In some instances, SSH credentials are used verify or acknowledge a user of the computing system with a user of the execution server. For example, the execution server may verify, using SSH credentials, that a user associated with the second workflow generated on the computing system is also a credentialed user of the execution server.

The execution server may include a workflow engine to validate the second workflow, once received from the communication component 150. In some instances, a validation component on the execution server may have a higher priority in checking validity of the second workflow. In some instances, the validation component on the execution server may contain more up-to-date definitions due to the execution server including a production environment configured to execute the second workflow in the second tool format. In instances where the validation component is included in the execution server, the communication component 150 may route the second workflow to the execution server using HTPS and SSH together.

In some embodiments, the computing system and the execution server may communicate via the communication component 150. When a change is generated on the first workflow, by the computing system, the change may be incorporated by the conversion component 130 and the validation component 140. The communication component 150 may then transfer an updated second workflow to the execution server. Similarly, when the execution server generates a change in the second workflow, an updated second workflow may be transmitted from the execution server via the communication component 150 to be incorporated into the first workflow by the conversion component 130. In some instances, corresponding conversion and validation components of the execution server may update the second workflow and generate an updated first workflow to transmit to the computing system. The computing system may reconcile changes between the first workflow and the updated workflow to integrate the updated version and maintain version management. In some instances, both the computing system and the execution server, or users associated therewith, may edit the workflow, exchange changes, and communicate via a secured protocol. In such instances, each user of the respective computing system and execution server may engage in the workflow edits while having limited knowledge of the tool format of the other user's resource, system, server, or infrastructure.

As described herein, the infrastructure of the workflow conversion system 102 may be implemented in a plurality of different architectures. For example, the workflow conversion system 102 may be implemented in x86, s390x, or any other suitable architecture. The infrastructure of the workflow conversion system 102 may also be implemented in independent environments which enable SS such as Linux, Windows, OS X, public clouds, or any other suitable environment. Further, the infrastructure of the workflow conversion system 102 may be executed in various levels of a stack, such as virtual machines, containers, or any other suitable stack level. The infrastructure may also run natively as an operating system container extension, and may use a native SSH channel to the operating system to increase operation and transmission security.

Figure 3:
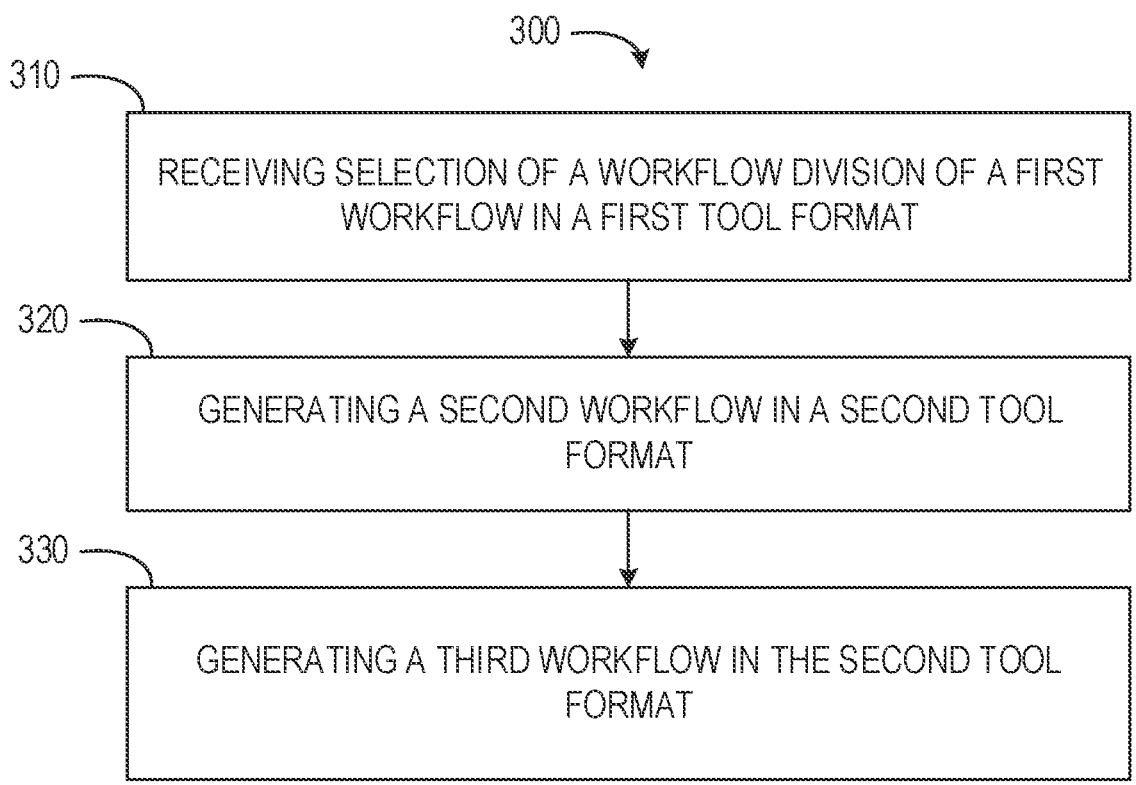
FIG. 3 depicts a flow diagram of a computer-implemented method for intelligent file conversion, according to at least one embodiment.

FIG. 3 shows a flow diagram of an embodiment of a computer-implemented method 300 for intelligent file conversion. The method 300 may be performed by, or within, the computing environment 100. In some embodiments, the method 300 comprises or incorporates one or more operations of the method 200.

In operation 310, the access component 110 receives selection of a workflow division. The selection of the workflow division may represent one or more portions of the first workflow. The one or more portions of the first workflow may represent modules, sections, or task sets within the first workflow. In some embodiments, the selection of the workflow division includes an indication of a first module and a second module. The first module and the second module may be part of the first workflow. The first module and the second module may perform different tasks, functions, or set of operations that are part of the first workflow.

In some embodiments, one or more selections of the workflow division may be received after receiving or accessing the first workflow by the access component 110. For example, a user of the computing system may pass the first workflow to the access component 110, such as by dragging a file including the first workflow into a user interface element of a graphical user interface. In some embodiments, upon receipt of the first workflow by the access component 110, the access component 110 may prompt generation and presentation of user interface elements configured to enable selection of one or more workflow divisions. In some instances, one or more components of the workflow conversion system 102 may parse the first workflow to automatically identify suggested partitions or divisions for the first workflow. The graphical user interface may present the suggested partitions to the user and present user interface elements to select or designate user defined workflow divisions.

In operation 320, the conversion component 130 generates a second workflow in the second tool format. The second workflow is generated based on the set of second elements. The second workflow corresponds to a first module of the first workflow. The second workflow may be generated by the conversion component 130 in a manner similar to or the same as described above with respect to operation 230.

In operation 330, the conversion component 130 generates a third workflow in the second tool format. The third workflow is generated based on the set of second elements. The third workflow corresponds to a second module of the first workflow. The third workflow may be generated by the conversion component 130 in a manner similar to or the same as described above with respect to operation 230.

In some embodiments, each selected workflow division may be converted independently to generate the second workflow and the third workflow in discrete operations. In such instances, the second workflow and the third workflow may be separately converted and validated as separate or distinct files. In some embodiments, the first workflow is converted in the manner described with respect to method 200. During the conversion of the first workflow, the conversion component 130 may insert divisions to generate the second workflow and the third workflow. The divisions may be represented as defined modules, defined functions, separate files, or any other suitable division. In some embodiments, the separation of the second workflow and the third workflow may be performed after conversion of the first workflow or after validation of a converted workflow.

Figure 4:
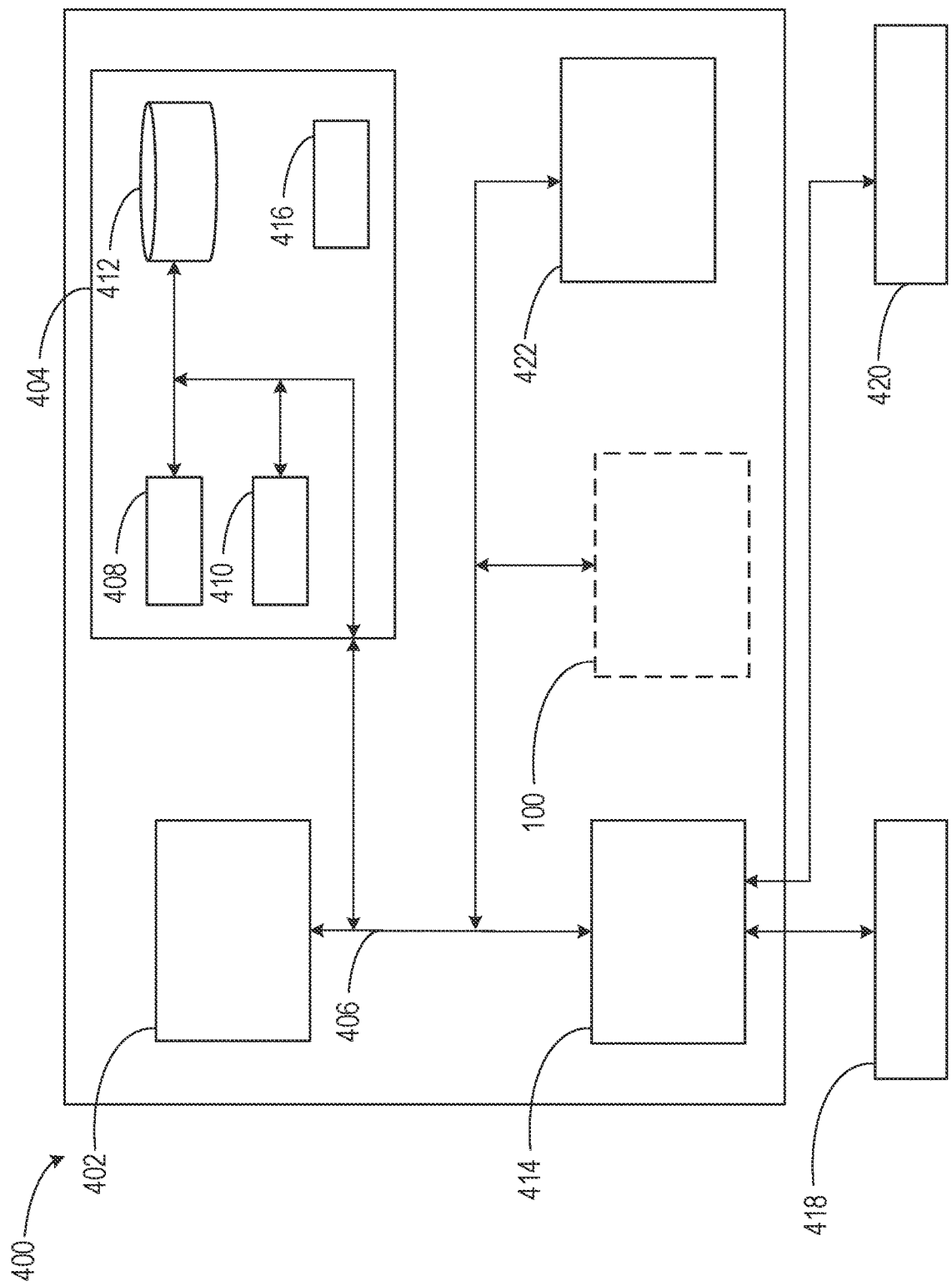
FIG. 4 depicts a block diagram of a computing system for intelligent file conversion, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system, execution server, or computing system) suitable for executing program code related to the methods disclosed herein and for intelligent file conversion.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the access component 110, the mapping component 120, the conversion component 130, the validation component 140, and the communication component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
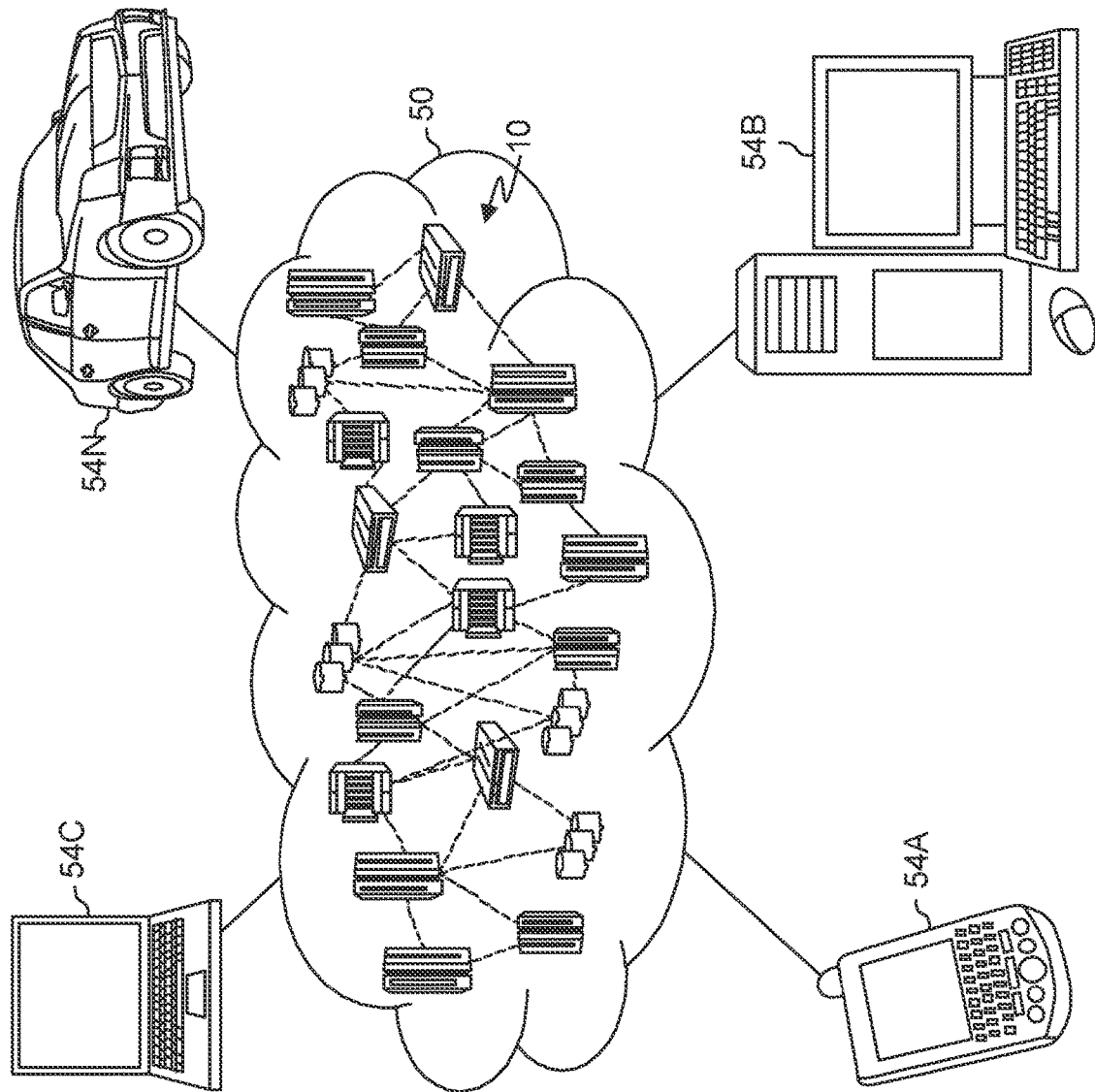
FIG. 5 is a schematic diagram of a cloud computing environment in which concepts of the present disclosure may be implemented, in accordance with an embodiment of the present disclosure.

Referring now to FIG. 5, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B (e.g., execution server or computing system), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
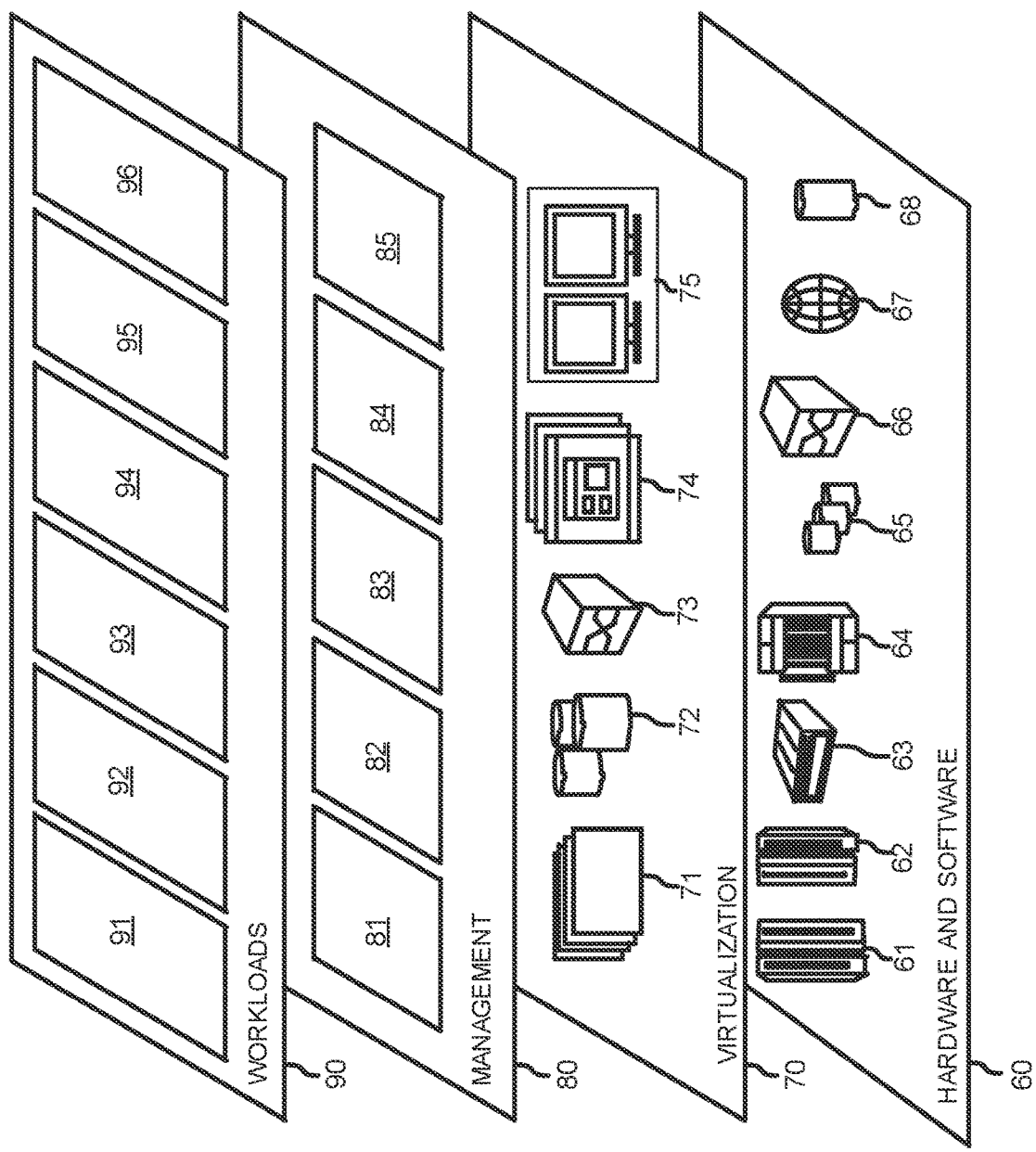
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task conversion processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a first workflow in a first tool format, the first workflow containing a set of first elements associated with a set of tasks;
mapping the set of first elements in the first tool format to a set of second elements in a second tool format, wherein the mapping comprises:
parsing the set of first elements based on a language syntax definition that defines relationships between elements in the first tool format and elements in the second tool format;
generating a second workflow in the second tool format based on the mapped set of second elements;
validating the second workflow based on a file definition schema for the second tool format, wherein the validating comprises determining that the second workflow fulfills all features of the first workflow and the first tool format that are compatible with the second tool format; and
routing the validated second workflow to an execution server.

2. The method of claim 1, wherein the first tool format is a human-readable data-serialization file and the second tool format is a temporary extensible markup language workflow.

3. The method of claim 1, wherein mapping the set of first elements to the set of second elements further comprises:
parsing each first element of the set of first elements based on the language syntax definition; and
mapping each first element to a second element in the second tool format.

4. The method of claim 1, wherein the first workflow includes a first module and a second module.

5. The method of claim 4, wherein the second workflow corresponds to the first module of the first workflow, the method further comprising:
generating a third workflow in the second tool format based on the set of second elements, the third workflow corresponding to the second module of the first workflow.

6. The method of claim 1, wherein the second workflow is routed to the execution server using a secure shell network protocol.

7. The method of claim 1, wherein the second workflow is routed to the execution server using a secure shell network protocol and secure socket layer.

8. A system, comprising:
one or more processors; and
a computer-readable storage medium, coupled to the one or more processors, storing program instructions that, when executed by the one or more processors, cause the one or more processors to perform operations comprising:
receiving a first workflow in a first tool format, the first workflow containing a set of first elements associated with a set of tasks;
mapping the set of first elements in the first tool format to a set of second elements in a second tool format, wherein the mapping comprises:
parsing the set of first elements based on a language syntax definition that defines relationships between elements in the first tool format and elements in the second tool format;
generating a second workflow in the second tool format based on the mapped set of second elements;
validating the second workflow based on a file definition schema for the second tool format, wherein the validating comprises determining that the second workflow fulfills all features of the first workflow and the first tool format that are compatible with the second tool format; and
routing the validated second workflow to an execution server.

9. The system of claim 8, wherein the first tool format is a human-readable data-serialization file and the second tool format is a temporary extensible markup language workflow.

10. The system of claim 8, wherein mapping the set of first elements to the set of second elements further comprises:
parsing each first element of the set of first elements based on the language syntax definition; and
mapping each first element to a second element in the second tool format.

11. The system of claim 8, wherein the first workflow includes a first module and a second module.

12. The system of claim 11, wherein the second workflow corresponds to the first module of the first workflow, the operations further comprise:
generating a third workflow in the second tool format based on the set of second elements, the third workflow corresponding to the second module of the first workflow.

13. The system of claim 8, wherein the second workflow is routed to the execution server using a secure shell network protocol.

14. The system of claim 8, wherein the second workflow is routed to the execution server using a secure shell network protocol and secure socket layer.

15. A computer program product comprising a computer readable storage medium having program instructions embodied therewith, the program instructions being executable by one or more processors to cause the one or more processors to perform operations comprising:
receiving a first workflow in a first tool format, the first workflow containing a set of first elements associated with a set of tasks;
mapping the set of first elements in the first tool format to a set of second elements in a second tool format, wherein the mapping comprises:
parsing the set of first elements based on a language syntax definition that defines relationships between elements in the first tool format and elements in the second tool format;
generating a second workflow in the second tool format based on the mapped set of second elements;
validating the second workflow based on a file definition schema for the second tool format, wherein the validating comprises determining that the second workflow fulfills all features of the first workflow and the first tool format that are compatible with the second tool format; and
routing the validated second workflow to an execution server.

16. The computer program product of claim 15, wherein the first tool format is a human-readable data-serialization file and the second tool format is a temporary extensible markup language workflow.

17. The computer program product of claim 15, wherein mapping the set of first elements to the set of second elements further comprises:
   parsing each first element of the set of first elements based on the language syntax definition; and
   mapping each first element to a second element in the second tool format.

18. The computer program product of claim 15, wherein the first workflow includes a first module and a second module and wherein the second workflow corresponds to the first module of the first workflow, the operations further comprise:
   generating a third workflow in the second tool format based on the set of second elements, the third workflow corresponding to the second module of the first workflow.

19. The computer program product of claim 15, wherein the second workflow is routed to the execution server using a secure shell network protocol.

20. The computer program product of claim 15, wherein the second workflow is routed to the execution server using a secure shell network protocol and secure socket layer.

* * * * *